(12) United States Patent
Chien

(10) Patent No.: US 8,511,877 B2
(45) Date of Patent: Aug. 20, 2013

(54) PROJECTION DEVICE FOR A VARIETY OF LIGHT DEVICES

(76) Inventor: Tseng-Lu Chien, Shi-Chi Town (TW)

( * ) Notice: Subject to any disclaimer, the term of this patent is extended or adjusted under 35 U.S.C. 154(b) by 0 days.

(21) Appl. No.: 13/540,689

(22) Filed: Jul. 3, 2012

(65) Prior Publication Data

US 2012/0268668 A1 Oct. 25, 2012

Related U.S. Application Data

(63) Continuation of application No. 12/624,621, filed on Nov. 24, 2009, now Pat. No. 8,303,150.

(51) Int. Cl.
*G03B 21/20* (2006.01)
(52) U.S. Cl.
USPC . 362/555; 362/800; 362/249.02; 362/311.01; 362/338

(58) Field of Classification Search
USPC ............... 362/84, 249.02, 249.11, 555, 565, 362/640, 643, 644
See application file for complete search history.

(56) References Cited

U.S. PATENT DOCUMENTS 6,192,824 B1 * 2/2001 Chang ........................... 116/173
6,558,022 B2 * 5/2003 Kawahara ..................... 362/257

* cited by examiner

*Primary Examiner* — Anabel Ton
(74) *Attorney, Agent, or Firm* — Bacon & Thomas, PLLC

(57) ABSTRACT

A projection assembly is arranged to be added onto or built into at least one LED-unit or other light-unit of an illuminated object that has more than one LED or other light source to cause the object to be illuminated and show the object's design or appearance while also offering illumination to people. The illuminated object may include all kinds of seasonal lighting, regular light fixtures, track lights, desktop lights, and battery operated lights having more than one light-unit or LED-unit.

13 Claims, 16 Drawing Sheets

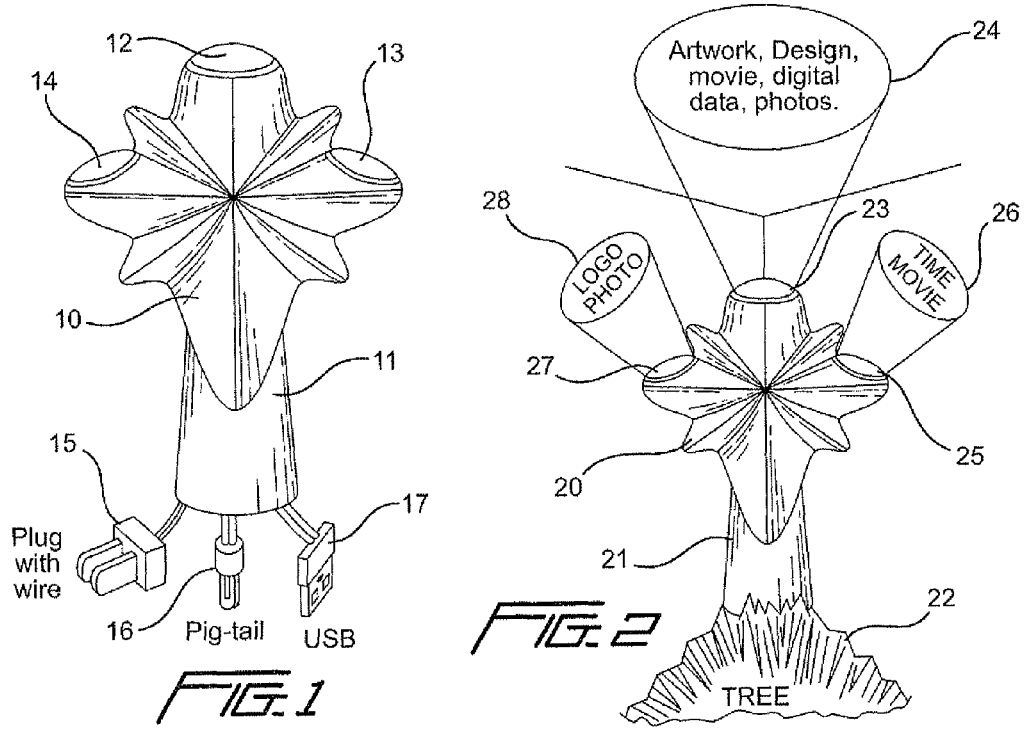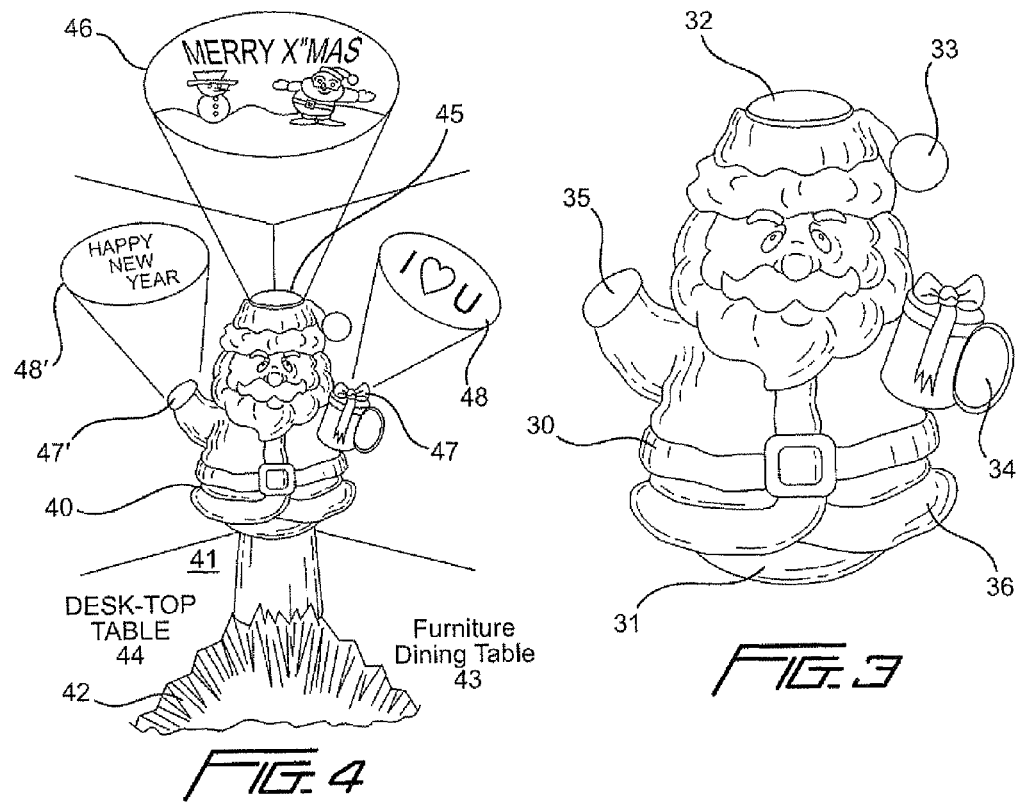

light fixture has LED units:
at least one can change anytime with project function.

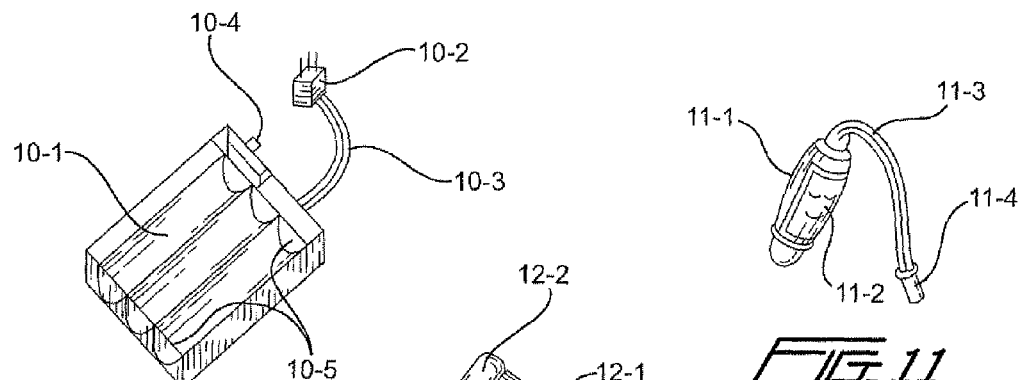
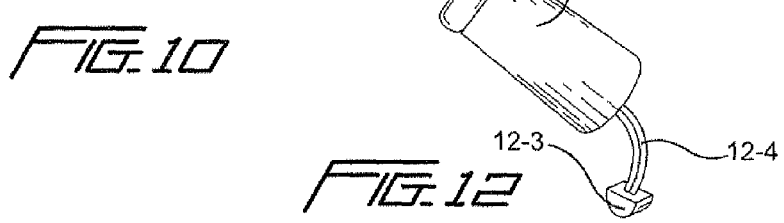
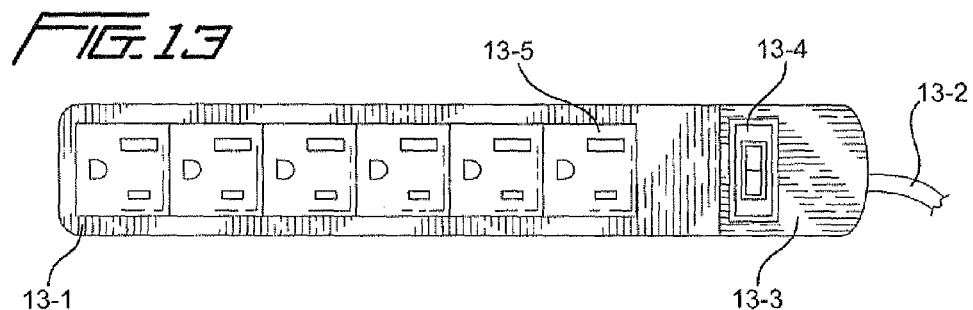
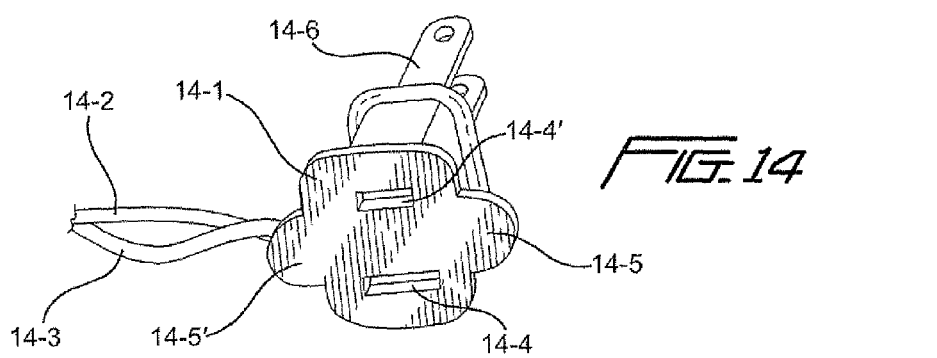
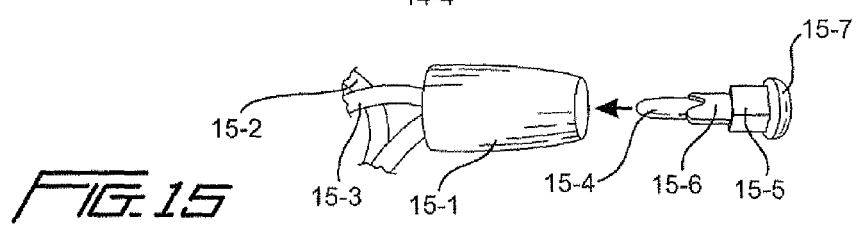

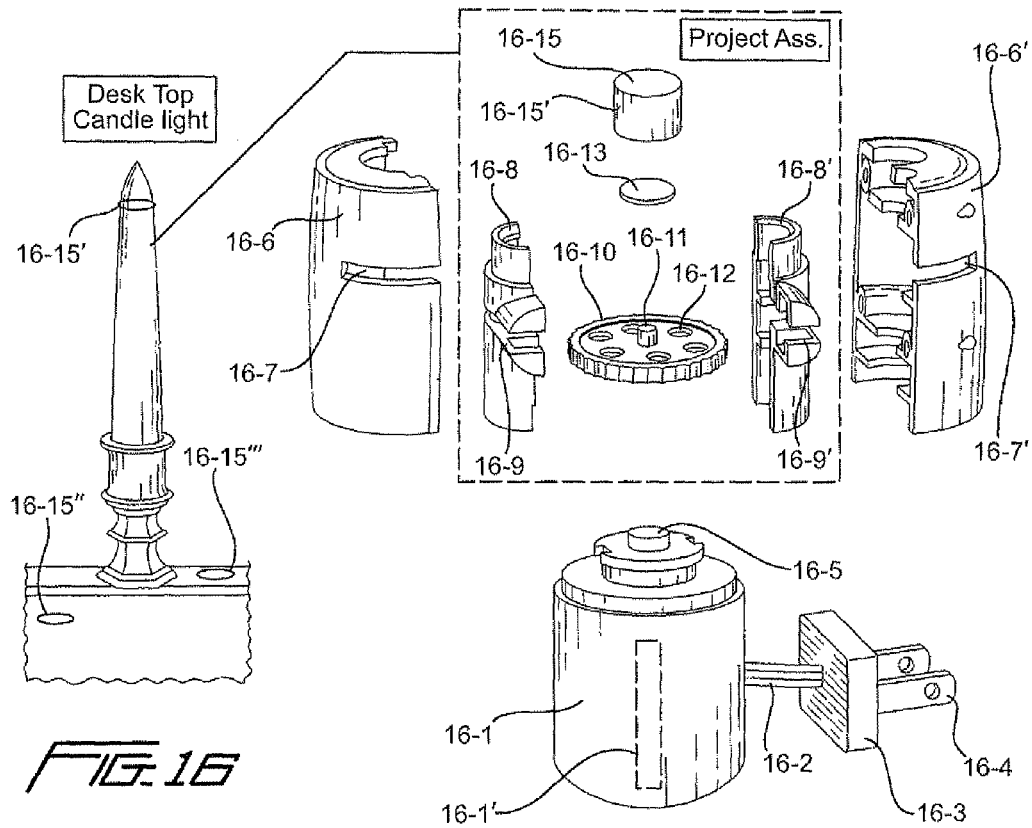
FIG. 16
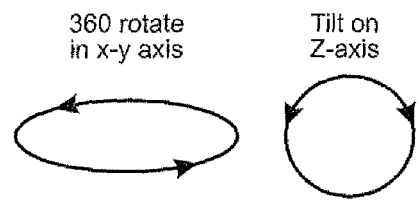
FIG. 16-1
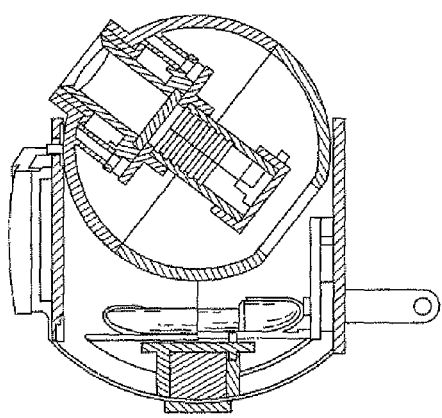

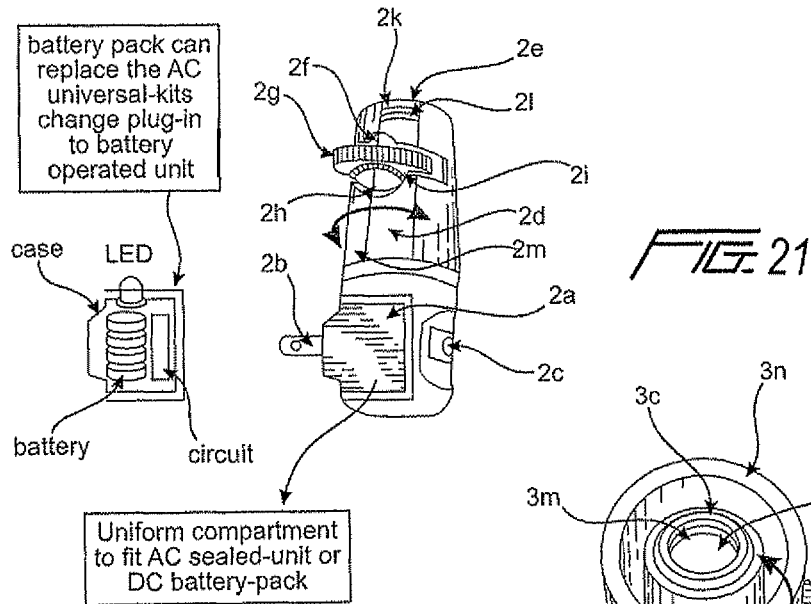
FIG. 21
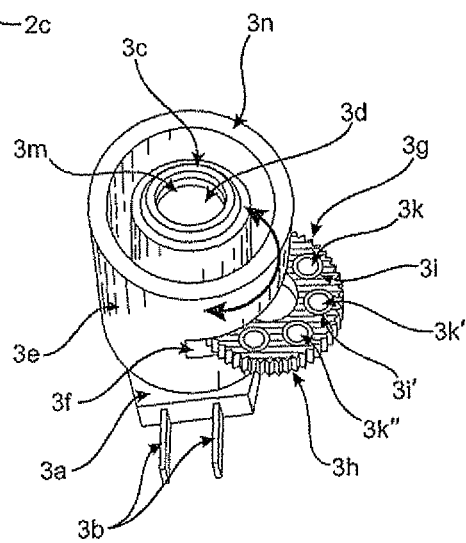
FIG. 23
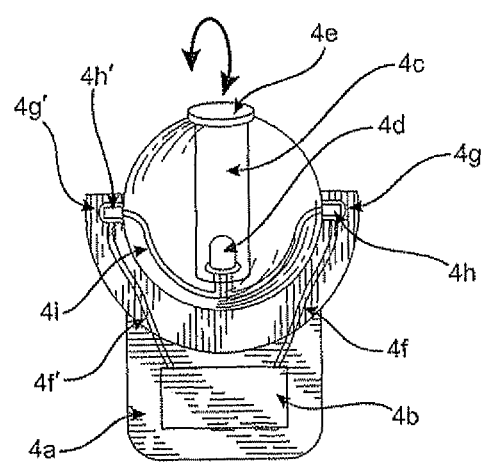
FIG. 24
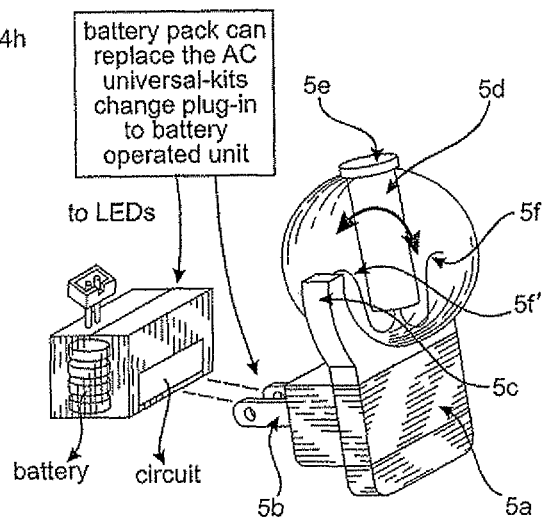

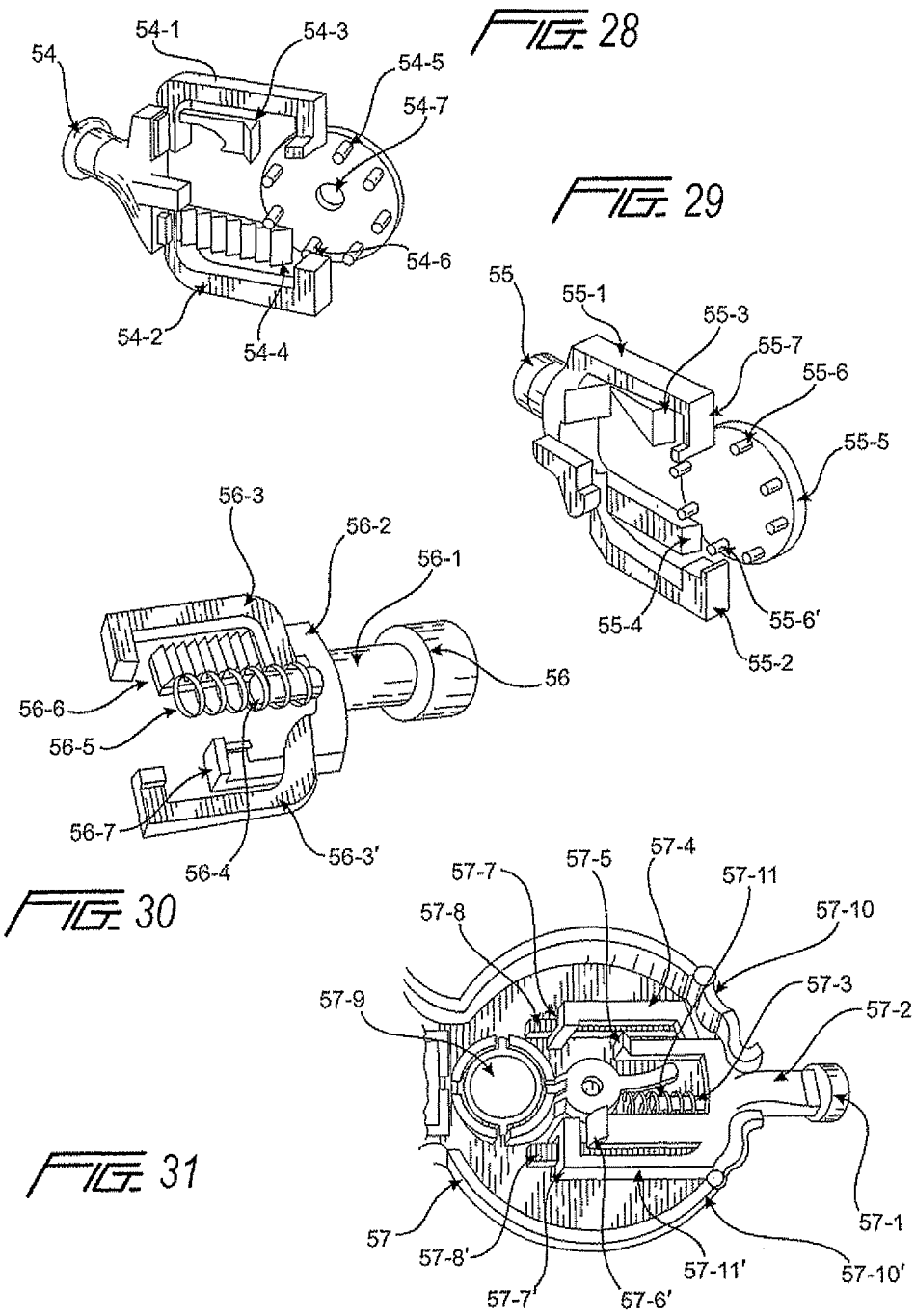

PROJECTION DEVICE FOR A VARIETY OF LIGHT DEVICES

This application is a continuation of U.S. patent application Ser. No. 12/624,621, filed Nov. 24, 2009, incorporated herein by reference.

BACKGROUND OF THE INVENTION

This application has subject matter in common with U.S. patent application Ser. Nos. 12/318,471, 12/318,470, 12/318, 473, 12/292,153, 12/232,505, 12/232,035, 12/149,963, 12/149,964, 12/073,095, 12/073,889, 12/007,076, 12/003, 691, 12/003,809, 12/806,711, 12/806,285, 12/806,284, 12/566,322, 12/527,628, 12/527,629, 12/498,874, 12/545, 992, 12/527,631, 12/502,661, 11/498,881, 11/255,981, 11/184,771, 11/152,063, 11/094,215, 11/092,742, 11/092, 741, and 11/094,155.

The current invention provides a projection assembly for a variety of LED (light emitting diode) lighting devices, including seasonal light string, seasonal desk-top light, seasonal ornament, seasonal door decorative item, seasonal garden light, seasonal outdoor lighting, LED lighting fixture, LED track light, LED USB light, LED battery-operated light, seasonal tree-top light, seasonal wall light device, and seasonal outdoor device. None of these light devices have a projection function. Instead, they just offer illumination. They are too limited for application and do not meet green concept. This invention enables a projection assembly to be added-on or built-into the existing variety of LED lights to not only can offer the original light function for illumination but also to add the ability to project an advertisement, seasonal image, promotion, message, electronic photo album, or other desired image to a preferred location.

The market place already includes a lot of projection clocks, projection pens, an slide projection machines, but all of these known devices use very complicated optics lenses.

The current invention applies an LED that has a diameter of 5 mm with super high brightness and low cost. This is not the same as other conventional market items using 1 Watt LEDs that have a high cost and power consumption. The updated LED used by the invention is from Japan Nichia Co., which offers low power consumptions ¼ W and ½ W LEDs having top quality with a high brightness for a long period of time. This save a significant amount of expense and power compared with prior projection toys or, business projection machines using greater than 1 Watt LED.

The current invention also applies a most economical projection assembly with as few as a single optics lens inside a tubular-housing to create a long distance image on a desired surface such as a ceiling, walls, ground, garage door, front door, outdoor walls, or patio.

The current invention also provides an add-on or built-in projection assembly for an existing LED light that can enhance the existing LED light to include additional functions without having a lot of tooling charges. For example, the invention can be used to add functions to products such as an LED track light, LED seasonal light string, LED lighting fixture, a plurality of LED light devices, and LED lights having more than one LED.

The current invention also provides a universal projection assembly that can be applied to a variety of LED lights. For example one standard projection assembly according to the invention can be put into different seasonal LED light devices including an LED light set, LED light string, tree top LED light, ornaments, Christmas tree ball LED light, front door LED light, garden LED light, garage LED light, patio LED light, outdoor LED light, and LED track light. This will save a lot of R&D and tooling charges because of the uniformity of the projection assembly.

The current invention also provides a special attachment means to allow people to add a projection assembly to one of the LEDs of an LED light string and that enables the projection assembly to be fixed at a certain angle, or adjusted to another angle at any time by adjustable attachment means. This will allow the traditional seasonal LED light string to no longer just save power consumption but also to deliver a seasonal message. A certain number of projection assemblies may be added-on or built-into the normal seasonal light string, which can include (1) a 10 piece LED light string or a 20, 30, 40 piece LED light string which may use battery power pack; (2) a 50 piece LED light string or 100 piece LED light string which may use 2.5 Volt input current, (3) a 35 piece LED light string or 70 piece, 105 piece, or 140 piece LED light string which uses the 3.0 Volt current.

Furthermore, the current invention also can use the same concept to add-on or build-in a proper projection assembly for an LED track light or any LED light having more than one LED. The projection assembly can be applied to any number from one to all of the lights in the track light, any number of which may be LED lights. This will very good for any existing track light because each light-unit can be added or removed from the track at any time. It will be appreciated that replacing any of the light sources to add a with a projection assembly will still fall within the current invention scope.

The projection assembly of the current invention may have a variety of different constructions, including (A) a fixed angle construction (B) a 180 adjustable angle construction (C) a construction that provides 360 degree rotation in an x-y plane with a predetermined degree of tilting with respect to the z-axis. The latter construction may be similar to that described in the inventor's U.S. Pat. No. 7,618,150 and other patent applications of the inventor. In addition, it is noted that light devices with more than one light source are described in the inventors' U.S. Pat. No. 7,455,444, and that the current invention may also use more than one LED or light source for the projection light device, with one or more LEDs having super strong brightness serving as a projection light source and other LED(s) or light sources providing at least the original light device's existing light performance and function. Still further, the current invention may also use the principles described in copending U.S. patent application Ser. No. 11/806,284, now allowed, which discloses the placement of more than one optics means in front of the LED(s) of a projection assembly for a related night light application.

The current invention may use the principle, disclosed in a number of copending applications and patents of the inventor, of a "sealed-unit" which includes all electrical components and has its own safety certification so as to eliminate the need for separate certification when non-electrical elements are added to make a final light device. The sealed unit may have any desired combination of LEDs, circuit means, sensor means, switch means, conductive means, and prong means, wires or pig-tail sets or conductive arrangements for connection to a power supply.

BRIEF DESCRIPTION OF THE DRAWINGS

FIG. 1 is a perspective view of a tree-top LED light having three projection assemblies arranged to work with different conductive means to connect to different power sources according to a first preferred embodiment of the invention.

FIG. 2 is a perspective view showing projection of an image on a desired surface such as a ceiling or walls, for the tree top LED light of FIG. 1.

FIG. 3 is a perspective view of a second preferred embodiment having a similar projection performance as the one shown in FIG. 2 but with a different outside housing design.

FIG. 4 shows details of the second preferred embodiment, including a battery power pack for a direct current power source application with six projection assemblies.

FIG. 17-1 is a perspective view showing an attachment means for the light string of FIG. 7, the attachment means holding one of the LEDs or light sources so as to enable a user to adjust an angle of the elongate body to a certain direction.

FIGS. 10, 11, and 12 are perspective views showing battery power pack sources with quick connectors for a projection assembly sealed-unit.

FIG. 13 illustrates the manner in which a projection device can get power an from outlet device.

FIG. 14 shows the manner in which a projection device for seasonal light can get power source from a seasonal adaptor set.

FIG. 15 is a perspective view illustrating an example of a seasonal light device in which electricity is supplied through a pig-tail set.

FIG. 16 includes various views of a fixed angle projection device for a variety of LED lights, including a candle desk-light with projection arrangements at its top and base.

FIG. 16-1 is a cutaway perspective view of a projection device with 360 degree rotation about a first axis and the ability to tilt with respect to a perpendicular axis, as originally disclosed in U.S. Pat. No. 7,618,150.

FIG. 17 is a cutaway view of a projection device that can be rotated more than 180 degrees.

FIGS. 20, 20A, 20B, and 21-39 are perspective views illustrating details of a projection assembly, adjustable angle construction, display change wheel, and sealed-unit for a projection unit as disclosed in copending applications of the inventor.

DETAILED DESCRIPTION OF THE PREFERRED EMBODIMENTS

Figure 5:
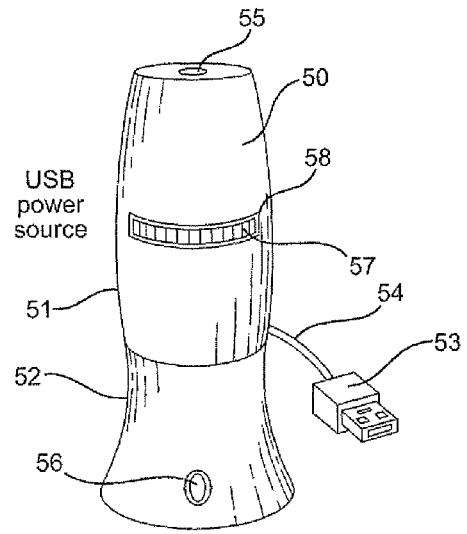
FIG. 5 is a perspective view of a third preferred embodiment in the form of an everyday product design (not seasonal for short time sales) having a projection assembly on a unit with a changeable original display wheel and a USB connector for connection to a power source.

The current invention provides the following major improvements:

1. a projection assembly that can be installed on a main object to add projection functions on top of any original LED light or light device functions;
2. a projection assembly that can be added-on or built-into any number of LED-unit(s) or light-unit(s) of an LED light or other light device such as seasonal light string or track light device that uses LEDs or other lighting elements as a light source;
3. a projection assembly with electrical parts and accessories included in a sealed-unit with its own safety test certification and that will fit into a variety of different housings of a variety of different final LED lights or light devicesso as to eliminate the need for safety certification of each of the final light devices, the sealed-unit being capable of being individually marketed separate from the final light devices;
4. a projection assembly incorporated with attachment means that can be added-on or built-in to at least one LED-unit or other light-unit to enable image projection to a desired location through an adjustable angle;
5. a projection assembly incorporated with a mechanical construction that enables rotation and/or tilting to project an image to a desired location;
6. a projection assembly incorporating a mechanical construction or electrical-device to to enable changing of the projected image;
7. a projection assembly having a separated tubular-housing that offers a bigger place to arrange a digital-data screen that serves as an image source for the projected image;
8. a projection assembly incorporated with an interchangeable power source that can be changed from a DC-battery-pack to AC-Sealed-unit with preferred prong means, plug and wires, pig-tails, a quick connector, a socket and plug, and/or conductive means;
9. a projection assembly having lower power consumption than the conventional 1 Watt LED using multiple optics lenses can provide;
10. a projection assembly that incorporates existing LED lights or other light devices having more than one LED-unit(s) or light-unit(s) but that adds the projection function on top of the existing functions such as those of a seasonal light string or conventional track light;
11. a projection assembly applied to a seasonal LED light or other light device that not only keeps the original seasonal LED light or light device performance but also adds the image projection function by a simple add-on or build-in projection assembly;
12. a projection assembly applied to a "main-object" defined as "any existing lighted object which offers illumination for the object itself to show the object appearance or offer illumination of an area to allow people to see," such as is the case with a tree top light, seasonal light, or track device all of which use lighting to illuminate shape or appearance or for illumination of an area, as distinguished from a conventional desk projection clock or toy projection device which does not have a function of illumination for its shape and appearance.

Figures 1, 17:
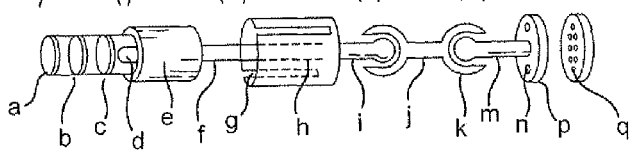

Details of the various embodiments that provide the above-listed improvements are discussed below in connection with the accompanying drawings:

FIG. 1 shows a seasonal tree top ornament with three projection assembly (12) (13) (14) arranged on top and at two side locations of a star (10) with a tree-top base (11) that enables installation on a tree or other surface. The three projection assemblies (12) (13) (14) and other light sources for star illumination are powered by a power source which may include a wall outlet, outlet device, computer, battery, solar power source, wind power source, or other kind of power source through a plug and wire (15), pig-tail set (16), USB connector (17), or any other equivalent electrical connection means.

As shown in FIG. 3, a Santa (30) has five projection assemblies (32) (33) (34) (35) (36) arranged on the head, hat, right hand, left hand, and clothes for top, sides, and ground image projection to provide five original displays. The Santa (30) has a base (31) which can fit on a desk top, dining table, closet surface, furniture, and all other desired surface and is powered by batteries, both for the projection light source for the light sources that illuminate Santa's body. The light source for the projection assembly and Santa can be LEDs or any other light source. It is to be appreciated that the lighted Santa is one preferred embodiment, which can be replaced by any kind of lighted object having an original function other than an image projection function. The current invention provides at least one projection assembly to add onto the original function of the existing lighted object and thereby increase the object's value.

FIGS. 10, 11, 12, 13, 14, and 15 all show various kinds of conventional power box and connection method to provide power for the lighted object and projection assembly of the current invention. FIG. 10 shows a battery box with a quick connector. FIG. 11 shows a compact size battery power pack having round LR 44 batteries inside and a quick connector for use with current invention. FIG. 12 shows a bigger battery box with lithium, carbonate, or alkaline batteries inside and a quick connector for connection of the power box to lighted objects and projection assemblies of the said current invention. FIG. 13 is a conventional power strip which has a plurality of outlets that can offer power to the light device of the current invention. FIG. 14 is a seasonal light strip plug with an adaptor device which also can offer power to the light device of the current invention when inserting a proper conductive connector into the adaptor (14-1) (14-4'). FIG. 15 shows a conventional pig-tail set of seasonal light strings, and one base (15-1) to receive the pig-tail end (15-4) which has an LED or light source socket (15-7) to receive an LED, bulb, or other light source. Electricity is delivered from the power wire (15-2) (15-3) to the LED, bulb, or other light source or bulb through a contactor inside the base (15-1) with electric-terminals (15-6) passing though the pig-tail end (15-4). Each pig tail has a certain electric voltage as discussed as below in connection with a special attachment means to allow people to add the projection assembly to one of the LEDs of an LED light string and fix the projection assembly at a desired angle, or enable adjustment to another angle at any time by an adjustable attachment means. This allows the traditional seasonal LED light string to not just save power but also to have the seasonal message delivered to more people. This means that it is possible to add-on or build-in any desired number of projection assemblies on the normal seasonal light string, such as (1) a 10 piece LED light string or a 20, 30, 40 piece LED light string which may use a battery power pack, (2) a 50 piece LED light string or 100 piece LED light string which may use a 2.5 Volt input current, or (3) a 35 piece, 70 piece, 105 piece, or 140 piece LED light string which uses 3.0 Volt current." Hence, the pig-tail is a good power source for low power consumption LED lights.

FIGS. 8, 9, 16, 16-1, 17-20, 20A, 20B, and 32-34 show different projection assemblies with, respectively:
(1) a fixed projection angle (FIGS. 16, 19, 20, 20A, 20B, and 32-34),
(2) a more than 180 adjustable projection assembly (FIGS. 17 and 18), and
(3) a more than 360 degree rotation about an axis and some degree of tilting with respect to a perpendicular axis (FIGS. 8, 9, and 16-1).

Figure 8:
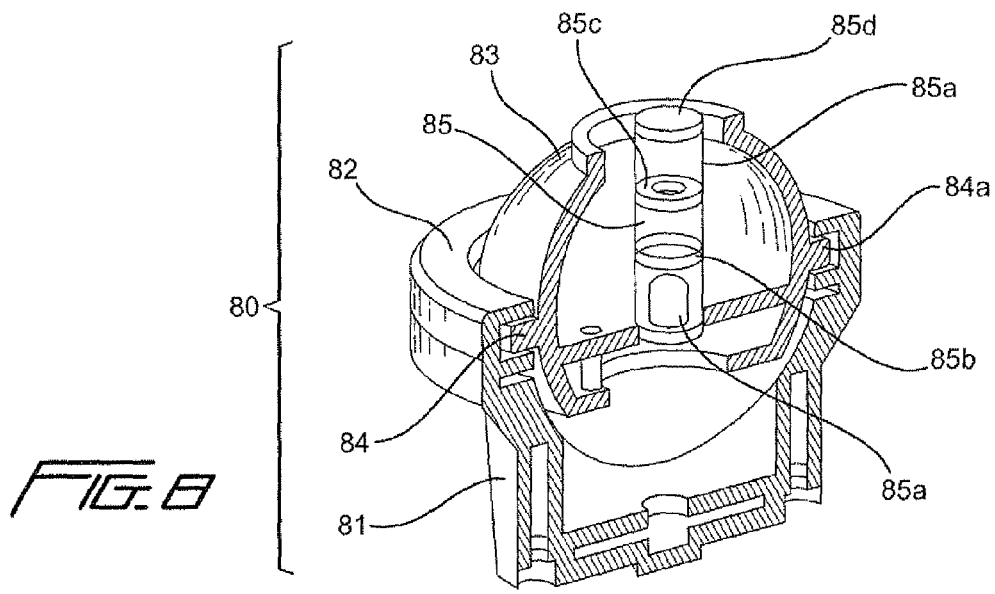
FIG. 8 is a cutaway perspective view of a light-unit or LED unit having a built-in projection assembly and mechanical construction to enable the projection assembly to rotate 360 degrees about an axis and tilt a certain degree about a perpendicular axis. The light source of this embodiment can be an LED or other any kind of light source.

As shown in FIG. 8, the projection assembly may includes a light source (85a), optics lens (85b), optics lens assembly, original display (85c), tubular-housing (85), and mechanical construction (not shown) for changing the magnification of the original display, which may be selected from a slide, film, digital data, LCD screen, stencil, miniature piece, indicia, art work, design, message, words, slogan, advertisement, and/or cartoon characters for appropriate enlargement and projection to a desired location.

Figure 25:
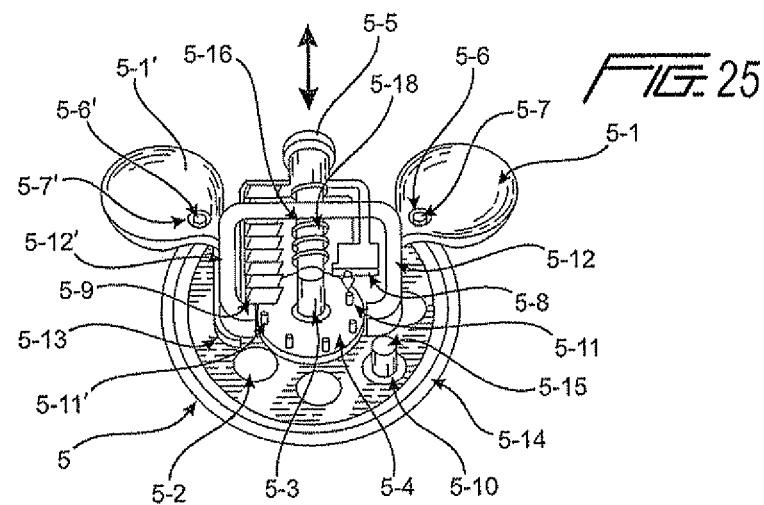
Figure 26:
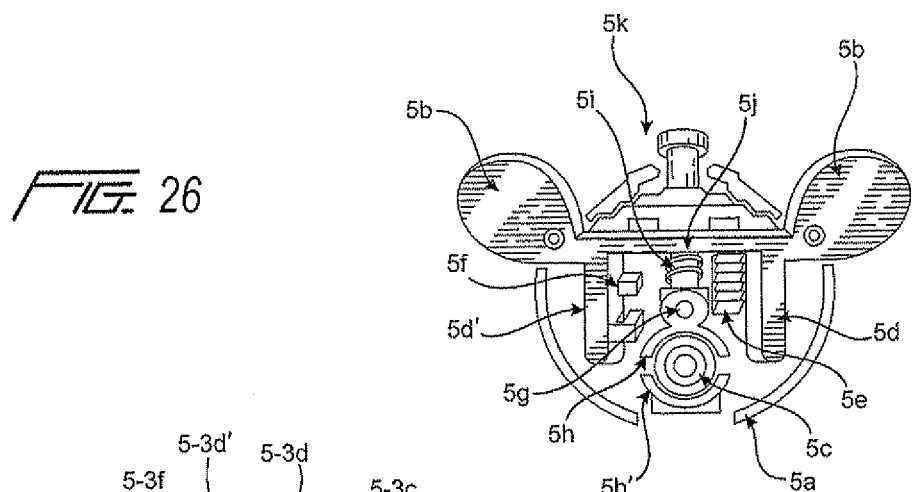
Figure 27:
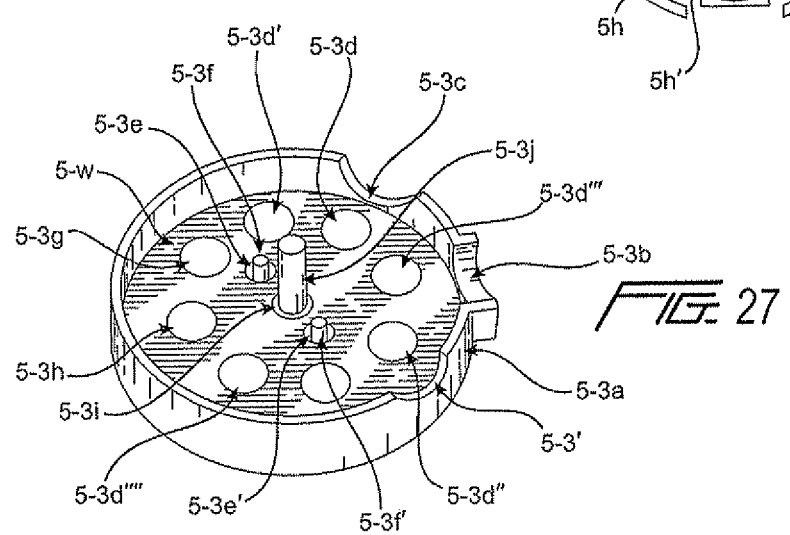
Figure 32:
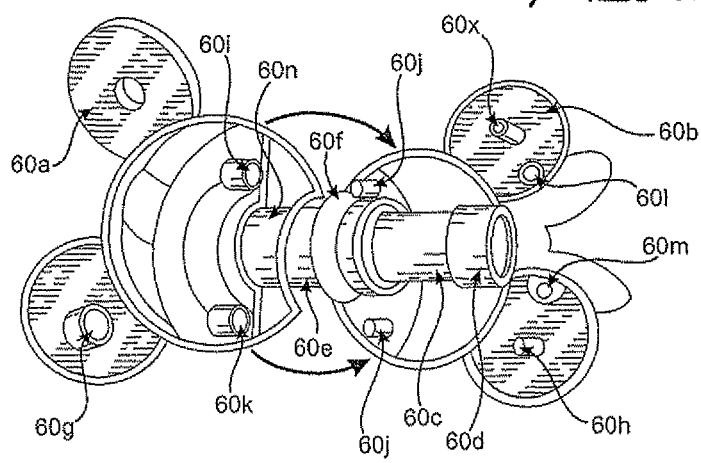
Figure 33:
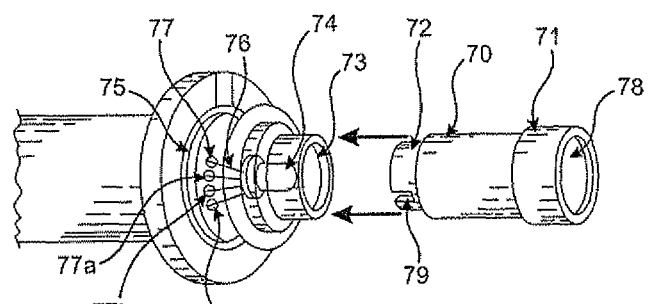
Figure 34:
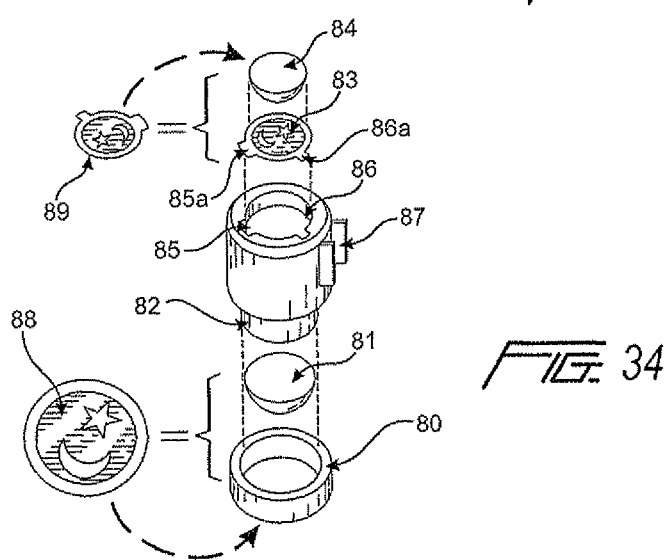
Figure 35:
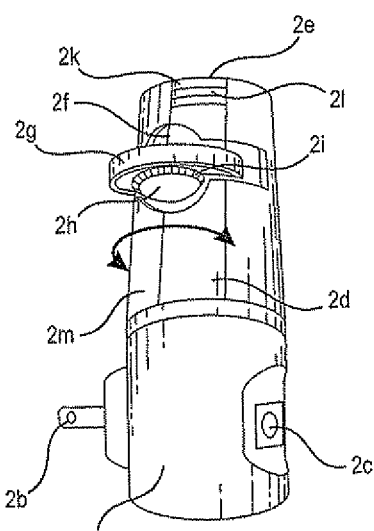
Figure 36:
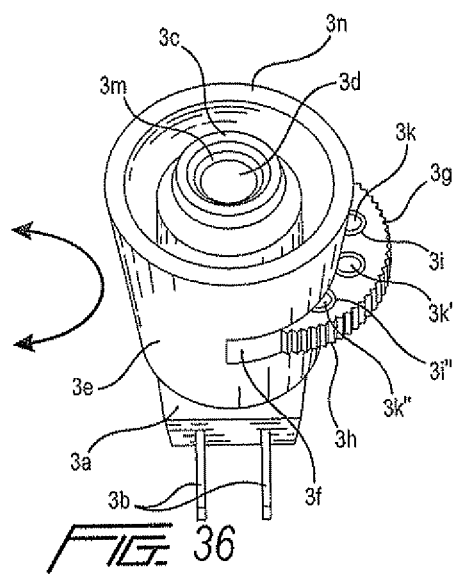
Figure 37:
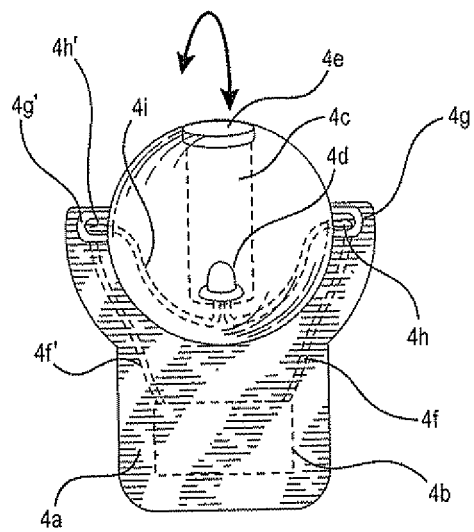
Figure 38:
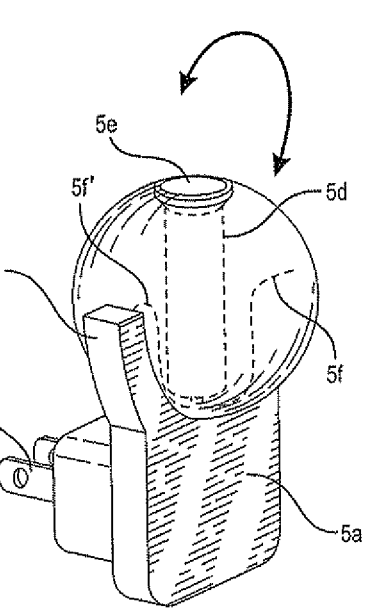

At least one project assembly 85 is arranged to be attached to the main-object (80) and may incorporates a corresponding mechanical construction (84a) (84b), electric circuit means (not shown), a digital data processor and accessories (not shown), and/or an electric device to provide a valuable appearance and function, such as fixed angle projection, (FIG. 16) (FIG. 19) (FIGS. 20,20A, and 20B) (Figs. page 32-34), adjustable angle projection (FIG. 17) (FIG. 18), a plurality of projections (FIG. 1) (FIG. 2) (FIG. 3) (FIG. 4), moving projection (FIG. 19), motion projection (FIG. 19), automatically changing projection (not shown), single image projection (FIG. 8), projection of changeable images (FIGS. 20-20B) (FIGS. 21-24) (FIGS. 25-27) (FIGS. 28-31), automatically changeable images (FIG. 19) and other desired functions. The optics lens assembly may be any combination of optics means, including those disclosed in the inventor's U.S. patent application Ser. No. 12/318,470 and U.S. patent publication No. 2009/0284960. The discussion of feature (9) at the beginning of the detailed description also refers to a very good optics-lens assembly for long distance projection of up to 10 feet, while short distance projection of less than 6 feet can use fewer lenses to save cost.

Figure 6:
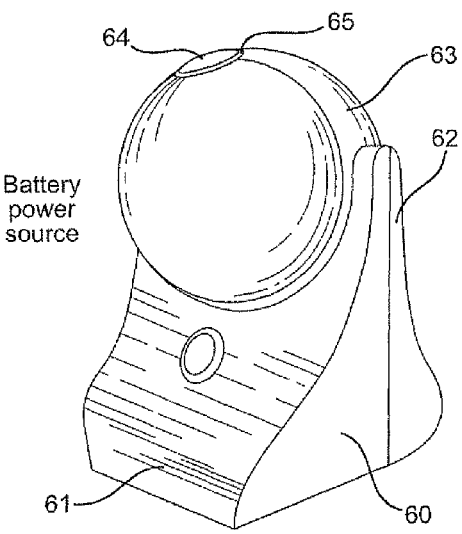
FIG. 6 is a perspective view of a fourth preferred embodiment which is also in the form of an everyday product design having a projection assembly on a battery-powered unit with a projection angle adjustable for over 270 degrees in one direction features.
Figure 9:
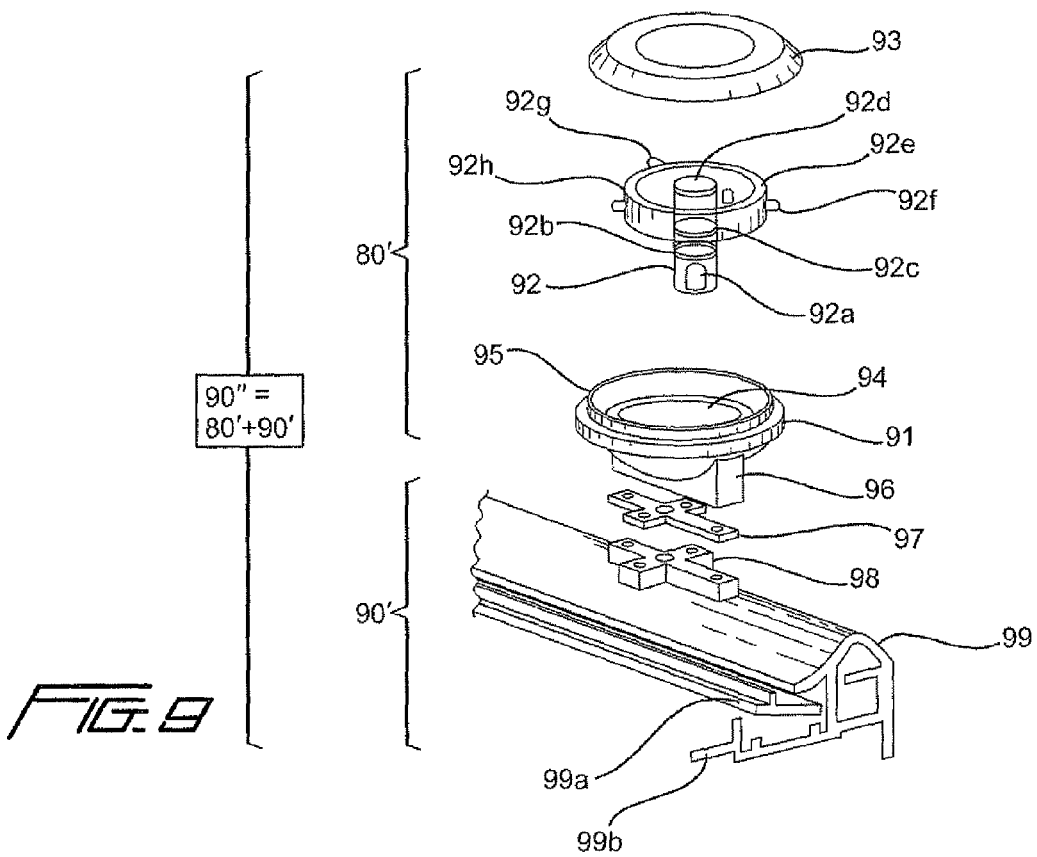
FIG. 9 is an exploded perspective view of the light-unit or LED-unit of FIG. 8 applied to a conventional track light device.
Figure 17:
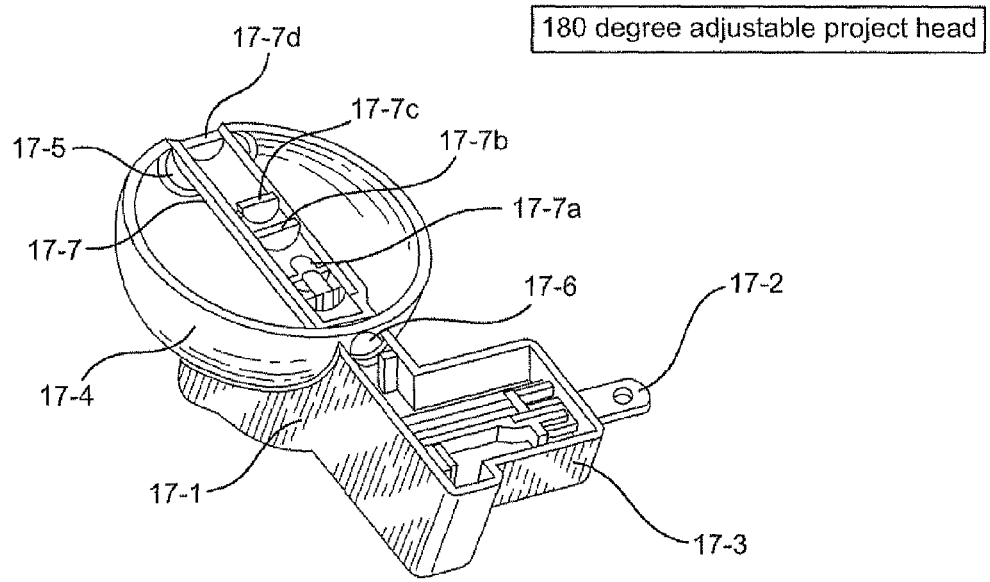

The main-object (80) of FIG. 8 and main object (80') of FIG. 9 may be identical. As shown in FIG. 9, The main-object (80') incorporates final-parts (90') to make a finished product (90") in the form of an LED light having a projection device. The LED light may be a seasonal light string (FIG. 7), seasonal desk-top light (FIG. 16), seasonal ornament (FIG. 40), seasonal door decorative items (FIG. 40), seasonal garden light (FIG. 16-1), seasonal outdoor lighting (FIG. 18), LED lighting fixture (FIG. 9), LED track light (FIG. 9), LED USB light (FIG. 5), LED battery operated light (FIGS. 3 and 6), seasonal tree-top ornament (FIGS. 2 and 4), seasonal wall light device (FIGS. 20, 20A, and 20B, 21-24, and 35-38), or seasonal outdoor device (FIG. 20-20B, 21-24, and 35-38).

Figure 7:
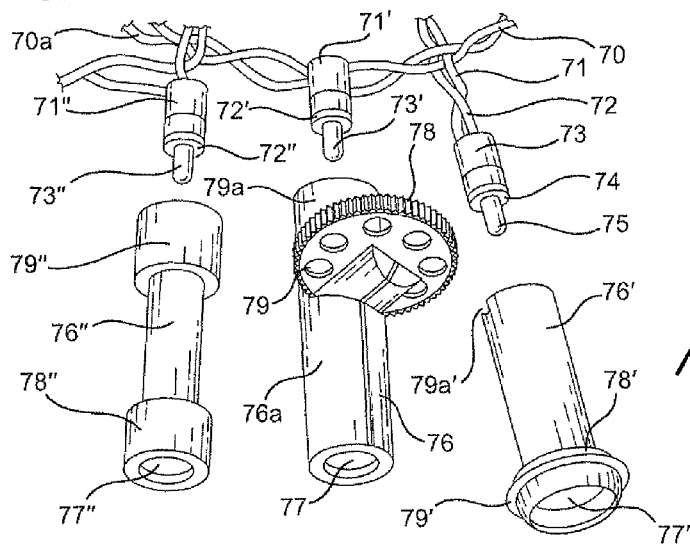
FIG. 7 shows a seasonal light string which light sources in the form of LEDs or bulbs to which are added different projection assemblies.

As shown in FIG. 7, the projection assembly (76) (76') (76") can be added onto any of LED light (71), light device (71'), or bulb (71") by quick install-means (not shown) to enable a respective at least one LED (73"), light source (73'), or bulb (73) to be incorporated into the corresponding at least one projection assembly (76) (76") (76'). The projection assembly (76) (76') (76") does not need to have any light source of its own since the displays (79) are illuminated by the at least one of LED (73'), light source (77") or bulb (73) from the LED light onto which it is retrofitted. Thus, as shown in FIG. 7, at least one of the main-objects (71) (71') (71") may have a projection assembly (76') (76) (76") with projection function incorporated into the same light string, whether the string is a 50 piece, 100 piece, or 35/70/105/140 piece string as described above.

Figure 39:
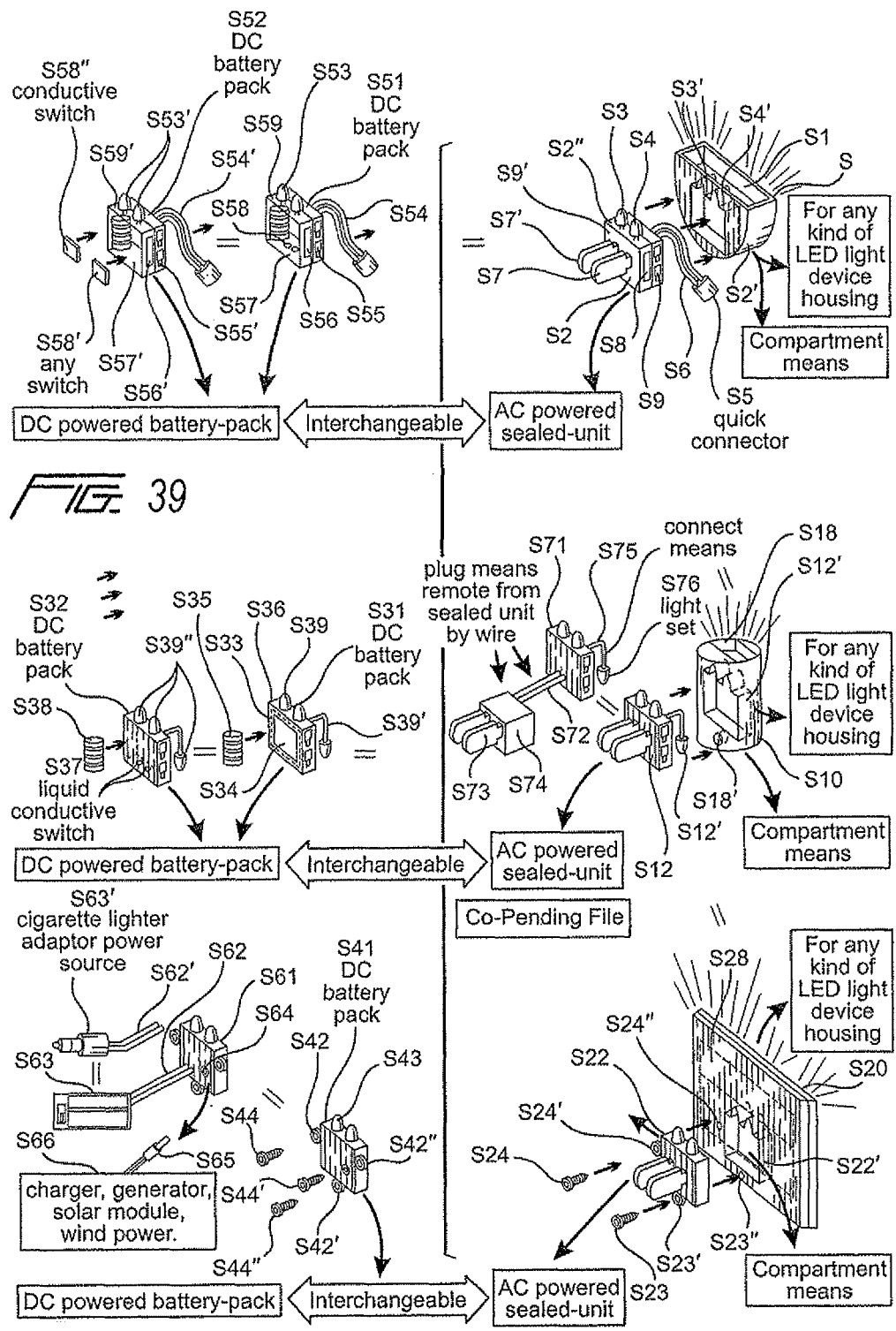

The LED light (70) may be selected from a seasonal light string (FIG. 7), LED track light device (FIG. 9), LED light fixture (FIG. 5), LED light device or LED light having more than one LED (FIGS. 17 and 39).

FIG. 17-1 also shows at least one projection assembly (17-1a) that is added onto or built into, and that incorporates an LED light's LED or other light source (17-1b). An attachment means (17-1c), (17-1d), (17-1e), or (17-1f) enables the projection means (17-1a) and the LED or other light source (17-1b) to have a desired orientation because the swivel base (17-1c) is connected with two end swivel rods (17-1d) and a swivel base (17-1e) to permit 360 degree rotation about an axis and tilting of the front projection assembly (17-1a) to project a desired image to a preferred location with correct size and sharpness.

As shown in FIGS. 21-23, and also FIG. 39, a projection device for a variety of light devices, includes at least one sealed-unit having built-in parts and accessories selected from LEDs or other light sources, circuit means, power input-means, conductive means, a plug and wire, pig-tail socket and plug, quick electric connector, socket and plug, electric components, a mechanical projection angle adjustment assembly, and/or means to change the original display. The sealed-unit has a geometric shape design and is powered by direct or alternating current through conductive means and circuit means to obtain a trigger voltage and current for the LED or other light source. The sealed-unit with all the parts and accessories will turn on the at least one LED or other light source to project an image to a preferred location or surface according to predetermined features, function, and performance. The sealed-unit must meet all safety standards and be safety test certified so that it can be incorporated with other final parts such as the projection assembly to make finished products without the need for additional safety certification.

As shown in FIG. 16, the projection assembly may be a fixed angle type which has a left tubular housing member (16-8) and a right tubular housing member (16-8') having an original display (16-11) that includes a plurality of slides (16-12) arranged on a wheel (16-10). Wheel (16-10) is arranged to fit into a groove (16-9) (16-9') to complete the slide-changing function. The front optics lens is precisely positioned so as to enable the original-display (16-11) to project an image having a pre-determined size to a predetermined distance. The projection assembly (as illustrated in the rectangular inset to FIG. 16) can be arranged to form a desk top candle light set. The flame portion has a projection top (16-15') and/or the base has two projection tops (16-15")(16-15''') to allow people to have a novel illuminated candle light set with three additional projection functions during the holiday season.

Figure 18:
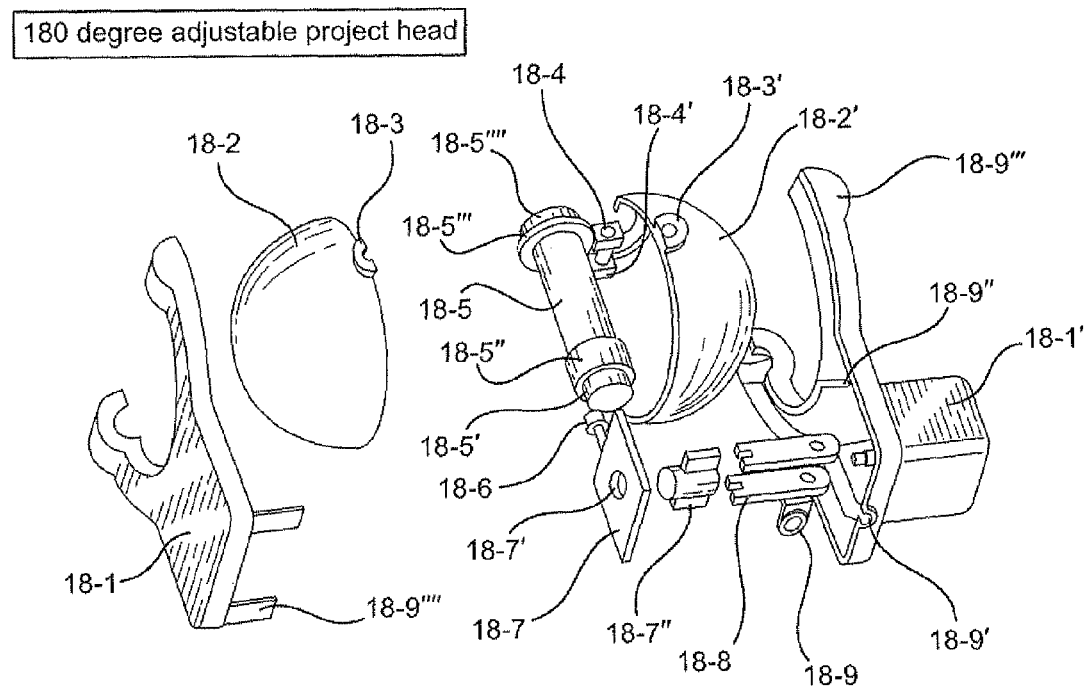
FIG. 18 is an exploded perspective view showing additional details of the projection device of FIG. 17.

As shown in FIGS. 17 and 18, the projection assembly (18-5) is designed for over 180 degree or continuous rotation. Two extended elastic electric-contacts (18-3) (18-3') on each half ball enable the ball to continuously rotate without any damage to the electric connection because the contacts are resilient. The projection assembly (18-5) of FIG. 18 is similar to projection assembly (17-7) of FIG. 17 and has a tubular housing that allows a light source (17-7a) to emit a light beam to a first optics lens (17-7b) and cause all light source light beams to be parallel to the original-display (17-7c). The original-display (17-7c) must be very precisely positioned relative to a second optics lens (17-7d) so that the projected image from the original display will be correctly displayed. If the distance is just slightly off, the image will look very bad and be out of focus.

Figure 19:
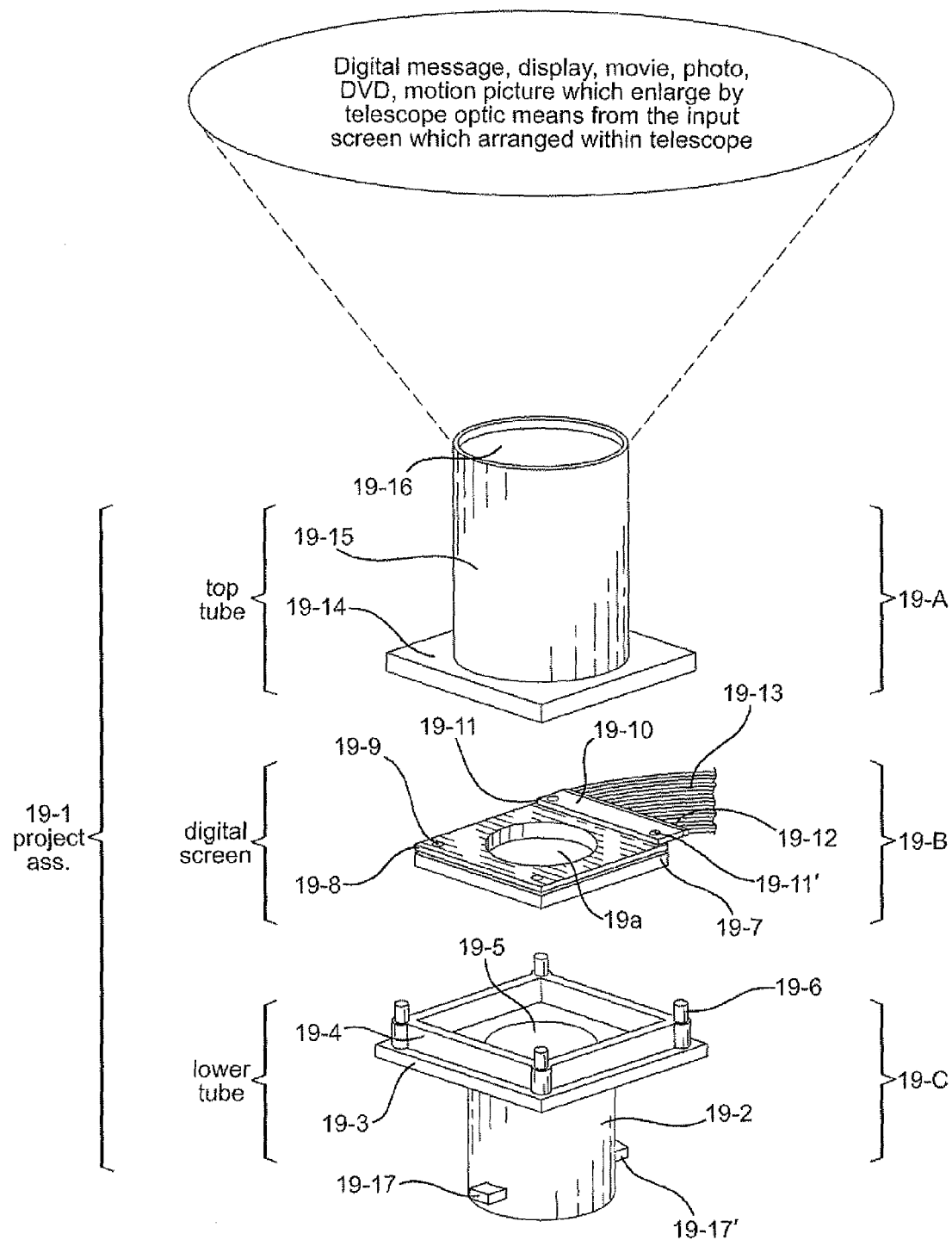
FIG. 19 is an exploded perspective view of an arrangement that uses a screen displaying changeable original display data as an updateable image source.
Figure 20:
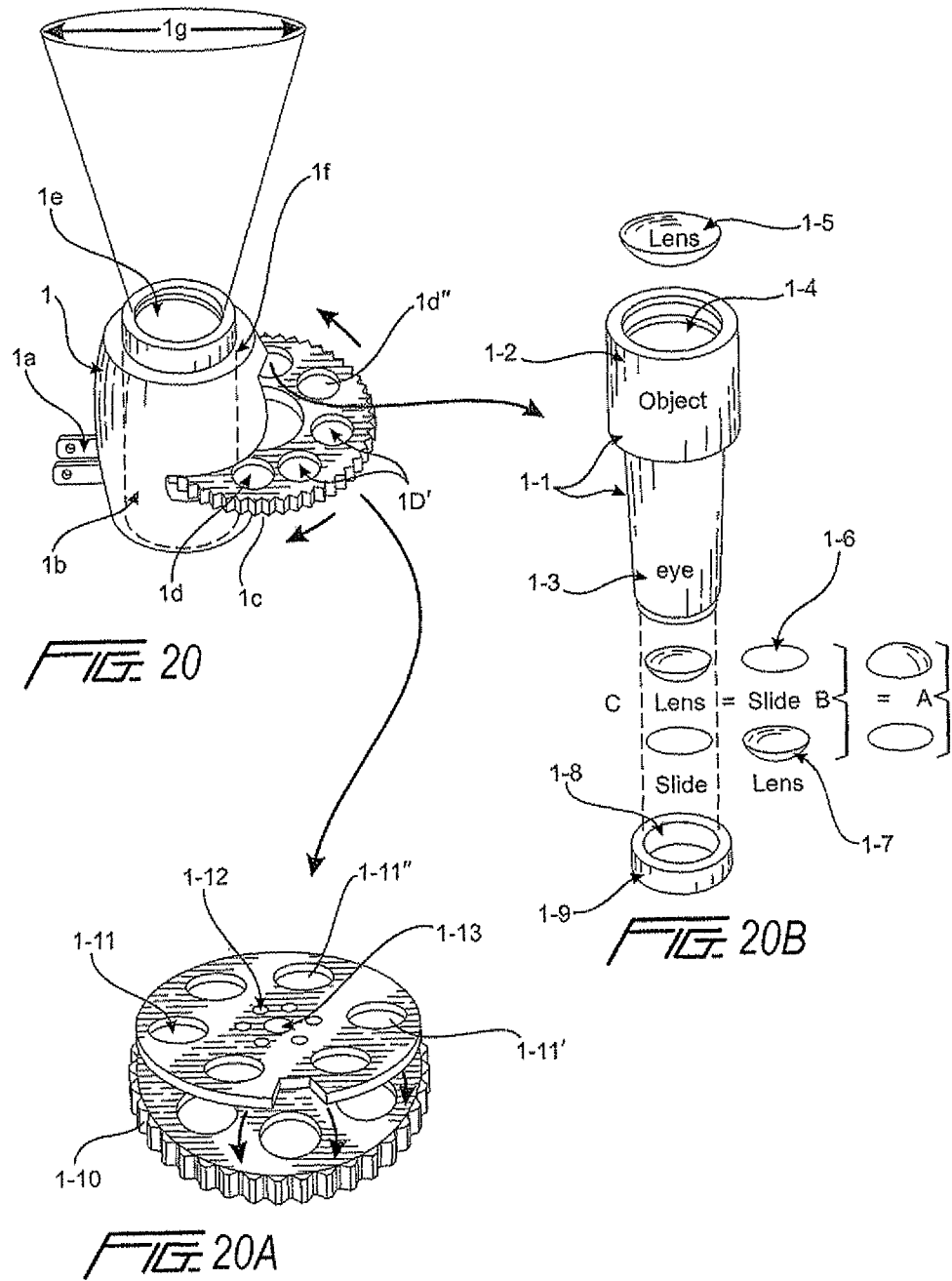

FIG. 19 shows an arrangement of an original-display (19a) in the form of a screen which has changeable original display data that is continuously or periodically updated. The screen (19a) is connected with a plurality of data delivering wires (19-13) in such a way as to leave enough space to allow the data wires to be correctly installed and make very good electric connections. In case of complicated and high volume data delivery, the projection assembly requires a special arrangement including a top tube (19-A) and lower tube (19-C). The lower tube (19-C) has a flat surface (19-3) with walls (19-4) that include terminals or poles to tightly connect with the top tube portion. The flat surface (19-3) and walls (19-4) form a recess to allow the original-display (19a) to fit with the space and offer sufficient space to arrange a lot of data wires (19-13). The original-display of this embodiment is a screen (19-a) installed within a lower screen-holder (19-7) and top cover (19-8). The top cover (19-8) has one area (19-10) for a plurality of the screen's terminals (not shown) to connect with the data wires (19-13) using pressure-means (19-12) to press and fasten the wires (19-30 by fastening-means (19-11) (10-11'). This enables a large amount of data wires (19-13) to be provided so as to correctly deliver electric digital data to the screen and provide a changeable or movable image with sufficient resolution that it can be projected by the projection assembly to a desired location with a correct focus. The changeable digital data may be LCD display data, map data, TV image forming data, or any digital data that people might want to enlarge by projecting it to a desired location so that it can be viewed by more people.

Figure 40:
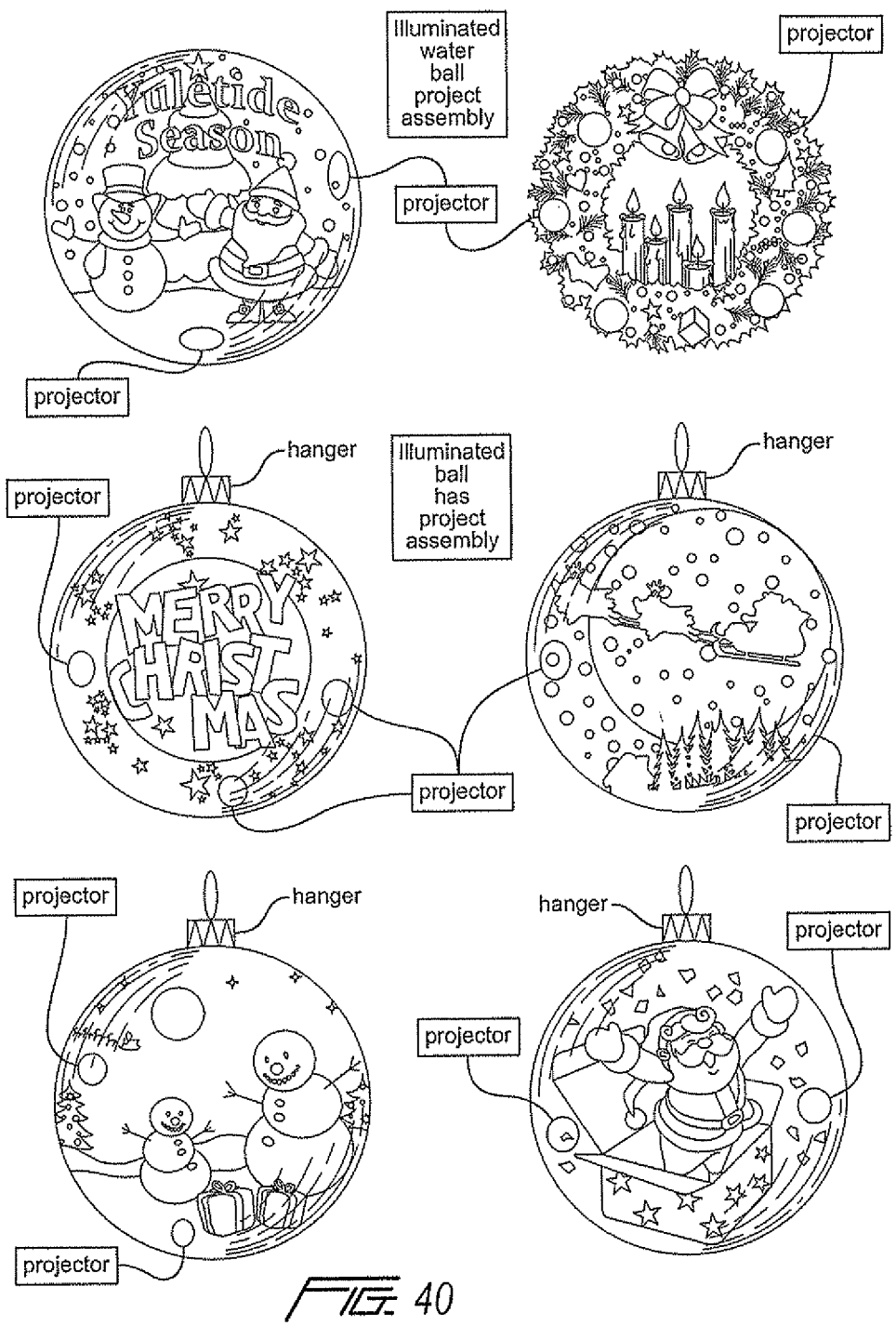
FIGS. 40 and 41 show examples of original display artwork so that may be projected to a desired location using the projection devices of the preferred embodiments.
Figure 41:
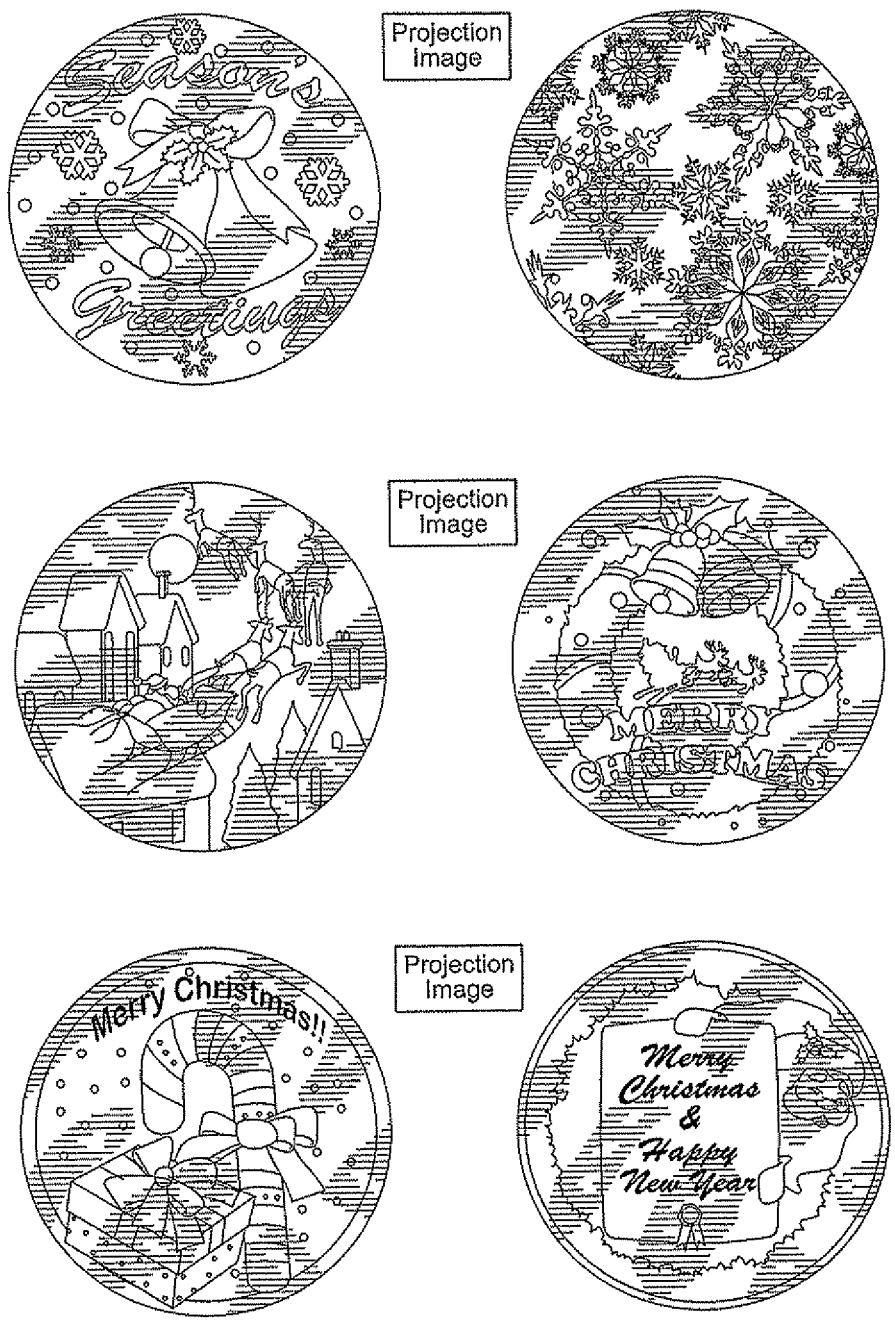

FIG. 40 shows the illuminated ornament balls each of which has at least one projection assembly inside the ball and a hanger to allow people to hang the illuminated ornament balls on a tree, door, handle bar, nail or anywhere people like. This is the best application to add a projection assembly to an illuminated object because the object can be hung on or placed on a desk top, allowing people to find the best position to get a clear image using a pre-set focus of the project assembly, so the cost will be very low. However, other applications or embodiments may incorporate focus-adjustment of the top lens, for example by including a mechanism that can change the focus by twisting the mechanism to change the distance from the top lens distance to the display as necessary to form the clearest and sharpest image. Thus, an adjustable focus lens assembly will still fall within the scope of the current invention scope. It will also appreciated that the projection assembly may be fitted within either a base or ball of an illuminated waterball. Those skilled in the art will also appreciate that the image projected to a desired location is not limited to seasonal or holiday images but may, as shown in FIG. 41, be any kind of art, design, shape, advertisement, logo, promotion words, message, display, stencil, painting, movie, time, motion picture, digital game, or digital data display image.

As a result, the invention should not limited to the above-discussed preferred embodiments. instead, all alternative, equivalent, same function, or replaceable skills, theories, arrangements, and constructions, including any those discussed in the inventor's copending projection light applications, may still fall within the scope of the current invention.

The invention claimed is:

1. A projection arrangement for a variety of LED lights, comprising:
    at least one projection assembly including means for enlarging and image and projecting the enlarged image onto a surface spaced from the projection assembly, said projection assembly including an optics lens; a display for forming said image to be projected by the lens; and a housing, wherein the display includes at least one of a slide, film, digital data, LCD screen, stencil, miniature piece, indicia, art work, design, and display of a message, words, slogan, advertisement, or cartoon character, wherein said at least one projection assembly is arranged to be assembled to a main object, to have a fixed or changeable projection angle, and to display moving images, an automatically or selectively changeable image, or a single image, and wherein said main object includes circuitry connected to a power source for providing power to at least one LED according to predetermined functions, said main object forming an LED light selected from the group consisting of a light of a seasonal light string, seasonal desk top light, seasonal ornament, seasonal door decorative item, seasonal garden light, seasonal outdoor lighting, lighting fixture, track light, USB light, battery-operated light, seasonal tree top light, seasonal wall device light, and seasonal outdoor device.

2. A projection arrangement for a variety of LED lights, comprising:

at least one projection assembly including means for enlarging and image and projecting the enlarged image onto a surface spaced from the projection assembly, said projection assembly including an optics lens; a display for forming said image to be projected by the lens; and a housing, wherein the display includes at least one of a slide, film, digital data, LCD screen, stencil, miniature piece, indicia, art work, design, and display of a message, words, slogan, advertisement, or cartoon character, wherein said at least one projection assembly is arranged to be assembled to an LED light by quick connect means for connecting the projection assembly to the LED light and enable said LED light to serve as a light source for said projection means, wherein said projection assembly does not include a light source of its own.

3. A projection arrangement for a variety of LED lights, comprising:

at least one projection assembly including means for enlarging and image and projecting the enlarged image onto a surface spaced from the projection assembly, said projection assembly including an optics lens; a display for forming said image to be projected by the lens; and a housing, wherein the display includes at least one of a slide, film, digital data, LCD screen, stencil, miniature piece, indicia, art work, design, and display of a message, words, slogan, advertisement, or cartoon character, wherein said at least one projection assembly is arranged to be assembled to a main object, to have a fixed or changeable projection angle, and to display moving images, an automatically or selectively changeable image, or a single image, and wherein said main object is one of a plurality of light units of an LED light, said projection assembly adding a projection function the LED light, and said LED light being selected from the group consisting of a light of a seasonal light string, seasonal desk top light, seasonal ornament, seasonal door decorative item, seasonal garden light, seasonal outdoor lighting, lighting fixture, track light, USB light, battery-operated light, seasonal tree top light, seasonal wall device light, and seasonal outdoor device.

4. A projection arrangement for a variety of LED lights, comprising:

at least one projection assembly including means for enlarging and image and projecting the enlarged image onto a surface spaced from the projection assembly, said projection assembly including an optics lens; a display for forming said image to be projected by the lens; and a housing, wherein the display includes at least one of a slide, film, digital data, LCD screen, stencil, miniature piece, indicia, art work, design, and display of a message, words, slogan, advertisement, or cartoon character, wherein said at least one projection assembly is arranged to be added to built-in to at least one LED of an LED light by attachment means for attaching the at least one projection assembly to the at least one LED so that the at least one LED serves as a light source for the projection assembly, attachment means further causing said projection means to have a desired orientation in order to project an image to a preferred location with a desired size and focus.

5. A projection arrangement for a variety of LED lights, comprising:

at least one projection assembly including means for enlarging and image and projecting the enlarged image onto a surface spaced from the projection assembly, said projection assembly including an optics lens; a display for forming said image to be projected by the lens; and a housing, wherein the display includes at least one of a slide, film, digital data, LCD screen, stencil, miniature piece, indicia, art work, design, and display of a message, words, slogan, advertisement, or cartoon character, wherein said at least one projection assembly is arranged to be built-in or added onto a main object, to have a fixed or changeable projection angle, and to display moving images, an automatically or selectively changeable image, or a single image, and wherein said main object is one of a plurality of light units of an LED light, said built-in or added-on projection assembly adding a projection function the LED light, and said LED light being selected from the group consisting of a light of a seasonal light string, seasonal desk top light, seasonal ornament, seasonal door decorative item, seasonal garden light, seasonal outdoor lighting, lighting fixture, track light, USB light, battery-operated light, seasonal tree top light, seasonal wall device light, and seasonal outdoor device.

6. A projection arrangement for a variety of LED lights, comprising:

at least one sealed-unit including a projection assembly, at least one LED or light source for the projection assembly, circuitry, conductors, accessories and components for carrying out at least one of the following functions: supplying power to the LED or light source, changing a display through which light from the LED or light source is projected, and for adjusting an angle of the projection assembly, wherein said sealed-unit is powered by direct or alternating current through said circuit and conductors to provide a trigger voltage and current for the LED or light device and cause an image to be projected from the sealed unit according to predetermined projection features, function, and performance, and wherein all electrical parts are provided within the sealed unit to enable the sealed unit to be added to a light device without requiring separate safety certification of the added-onto light device.

7. A projection arrangement for a variety of LED lights as recited in claim 1, wherein said main object is arranged to offer illumination of the main object itself to illuminate the main object's shape and appearance, in addition to a projection function provided by said projection assembly.

8. A projection arrangement for a variety of LED lights as recited in claim 1, wherein means for supplying electricity from the power source to the at least one LED are selected from one or more of: circuitry, an integrated circuit (IC), a plug with wires, a pig tail set, prongs, a switch, a sensor, a seasonal light string wire, a battery, a battery bracket, a timer, conductors, resilient conductors, electric components, and accessories to cause the LED to exhibit a desired illumination function and performance.

9. A projection arrangement for a variety of LED lights as recited in claim 8, wherein said means for supplying electricity from the power source to the at least one LED are included in the main object.

10. A projection arrangement for a variety of LED lights as recited in claim 1, wherein said main object includes final parts selected from one or more of: plastic parts, metal parts, wires, conductive parts, a track for a track light, and a light string.

11. A projection arrangement for a variety of LED lights as recited in claim 1, wherein the projection assembly further includes an adjustable-focus arrangement.

12. A projection arrangement for a variety of LED lights as recited in claim 1, wherein the projection assembly includes means for changing the display.

13. A projection arrangement for a variety of LED lights as recited in claim 1, wherein the main object includes means for changing an angle of the projection means.

* * * * *